United States Patent [19]

Willman

[11] Patent Number: 5,651,105
[45] Date of Patent: Jul. 22, 1997

[54] GRAPHIC INPUT AND DISPLAY OF NETWORK BASED COMPUTATIONS

[76] Inventor: Todd J. Willman, P.O. Box 270, Woodsfield, Ohio 43793

[21] Appl. No.: 259,857

[22] Filed: Jun. 15, 1994

[51] Int. Cl.$^6$ .................................................. G06T 11/00
[52] U.S. Cl. ............................................. 395/140; 395/356
[58] Field of Search .......................... 395/140, 145–149, 395/155–161; 364/488, 512, 578

[56] References Cited

U.S. PATENT DOCUMENTS

| | | | |
|---|---|---|---|
| 5,050,091 | 9/1991 | Rubin | 364/488 |
| 5,063,520 | 11/1991 | Klein | 364/512 |
| 5,202,843 | 4/1993 | Kunimine et al. | 364/578 |
| 5,276,789 | 1/1994 | Besaw et al. | 395/161 X |
| 5,276,791 | 1/1994 | Palmer | 395/155 X |
| 5,278,951 | 1/1994 | Camacho et al. | 395/161 X |

*Primary Examiner*—Almis R. Jankus
*Attorney, Agent, or Firm*—Carothers & Carother

[57] ABSTRACT

An automated system to draw detailed networks for use in various types of engineering analysis. A set of active node sites are available that are specified by entering the node number and selecting the desired node. Unused node sites can be removed or shown again as necessary. Elements between nodes are then automatically drawn by specifying the node start and node end of each element and selecting a draw command by utilizing stored data arrays and coordinate based graphical system software. Elements can also contain various attributes types that are automatically drawn if selected. Values stored in the unique data arrays are available for use in engineering computations, as well.

2 Claims, 3 Drawing Sheets

Interface for a Coordinate Based Network Drawing System, Step 1

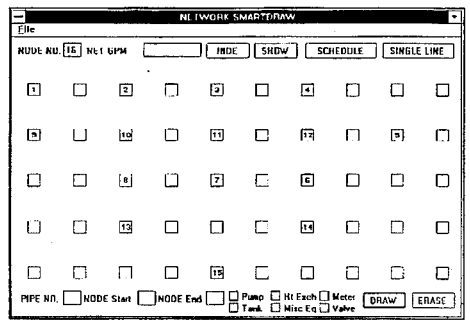

To identify the active node sites, enter the node number and then click on an active node button to label the button with the node number. The BREF( ) reference array is then updated to reflect the node label assigned to each button control number. For example, when clicking on node #4, then BREF(4) = 7. When clicking on node #7, then BREF(7) = 25. When clicking on node #15, then BREF(15) = 45. For each activated node #j, then BTNSWT(j) = 1 otherwise BTNSWT(j) = 0.

Interface for a Coordinate Based Network Drawing System, Step 2

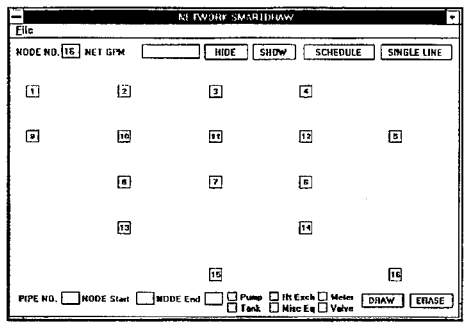

When the nodes have been identified, the unused nodes can be hidden by clicking on the Hide button. The BTNSWT( ) array is used to determine which nodes should be hidden. To add more nodes, click on the Show button to show all nodes. Node numbers can also be changed by entering a new number and clicking on the desired node. Other attributes can be added to nodes such as a net flowrate, load, etc and assigned as the node is labeled.

Interface for a Coordinate Based Network Drawing System, Step 3

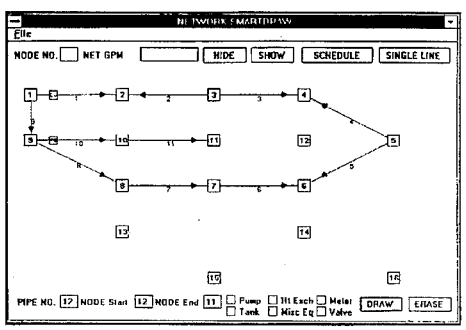

To identify the elements between nodes, enter the Node Start and Node End and click on the Draw button. In this example, the pipes are the elements. When the Draw button is selected, the pipe number is assigned to the pipe element drawn between the nodes and the NSTART( ) and NEND( ) arrays are updated. The NSTART( ) and NEND( ) arrays are used in the BREF( ) array to determine the coordinates of the start and end of the pipe element from the BXFAC( ) and BYFAC( ) arrays. Attributes such as process equipment can be selected and drawn, as well.

Figure 1: Unique Data Arrays for a Coordinate Based Network Drawing System:

BXFAC( ) Horizontal or "X" coordinate array that stores the graphic screen "X" coordinate for each node site or button. These coordinates start in Row #1, Column #1 and go to Row #1, Column #n and then to Row #2, Column #1, etc. The size of this data array equals the number of possible node sites or buttons.

BYFAC( ) Vertical or "Y" coordinate array that stores the graphic screen "Y" coordinate for each node site or button. These coordinates start in Row #1, Column #1 and go to Row #1, Column #n and then to Row #2, Column #1, etc. The size of this data array equals the number of possible node sites or buttons.

BTNSWT( ) Node site or button switch array to indicate if a node site or button has been activated. The size of this data array equals the number of possible node sites or buttons.

BREF( ) Node site or button reference array that indicates the button control number that is assigned to each selected node number. For example if node #7 is assigned to node site or button #12 then BREF(7) = 12. The size of this data array equals the number of possible node sites or buttons.

NSTART( ) Node start number as assigned by BREF( ) for each connecting element between node sites or buttons. The size of this data array equals the number of possible elements.

NEND( ) Node end number as assigned by BREF( ) for each connecting element between node sites or buttons. The size of this data array equals the number of possible elements.

Figure 2: Determination of Coordinates for specified node or button:

BXFAC(BREF(NSTART(ElementNumber))) For the specified Element, the Node Start number is identified by the NSTART array and used in the BREF array to determine which node site or button control number represents the node number specified. This node site or button control number determined by the BREF array is then used in the BXFAC array to return the actual screen horizontal or "X" coordinate for the selected node number. This BXFAC array is also used to determine the node end horizontal or "X" coordinate so that the graphic element can be drawn between the starting and ending nodes.

BYFAC(BREF(NSTART(ElementNumber))) For the specified Element, the Node Start number is identified by the NSTART array and used in the BREF array to determine which node site or button control number represents the node number specified. This node site or button control number determined by the BREF array is then used in the BYFAC array to return the actual screen vertical or "Y" coordinate for the selected node number. This BYFAC array is also used to determine the node end vertical or "Y" coordinate so that the graphic element can be drawn between the starting and ending nodes.

Figure 3: Process for Coordinate Based Network Drawing System:

```
Assign Nodes:
NodeButton_Click(index)  (index = 0 to n-1 nodes)
NodeNo = Val(NodeNumber.Text)
If NodeNo > 0 Then BTNSWT(NodeNo) = 1 Else  BTNSWT(NodeNo) = 0
Button(index).Caption = Nodenumber.Text
NBtn = index +1
BREF(NodeNo) = NBtn
End Sub
```

```
Hide/Show Nodes:
HideButton_Click
For x = 1 to NumberNodes
IF BTNSWT(NodeNo) = 0 then Button(x-1).Visible = 0  ( =1 for ShowButton)
Next x
End Sub
```

```
Draw Elements:
DrawButton_Click( )
ElementNo = Val(PipeNumber.Text)
ForeColor = _Red
BackColor = _White
X1 = BXFAC(BREF(NSTART(ElementNumber)))
Y1 = BYFAC(BREF(NSTART(ElementNumber)))
X2 = BXFAC(BREF(NEND(ElementNumber)))
Y2 = BYFAC(BREF(NEND(ElementNumber)))
LINE (X1,Y1) - (X2,Y2)
CurrentX = (X1+X2)/2:CurrentY = (Y1+Y2)/2
PRINT PipeNumber.Text
End Sub
```

```
Erase Elements:
EraseButton_Click( )
ElementNo = Val(PipeNumber.Text)
ForeColor = _White
BackColor = _White
X1 = BXFAC(BREF(NSTART(ElementNumber)))
Y1 = BYFAC(BREF(NSTART(ElementNumber)))
X2 = BXFAC(BREF(NEND(ElementNumber)))
Y2 = BYFAC(BREF(NEND(ElementNumber)))
LINE (X1,Y1) - (X2,Y2)
CurrentX = (X1+X2)/2: CurrentY = (Y1+Y2)/2
PRINT PipeNumber.Text
End Sub
```

Figure 4A: Interface for a Coordinate Based Network Drawing System, Step 1

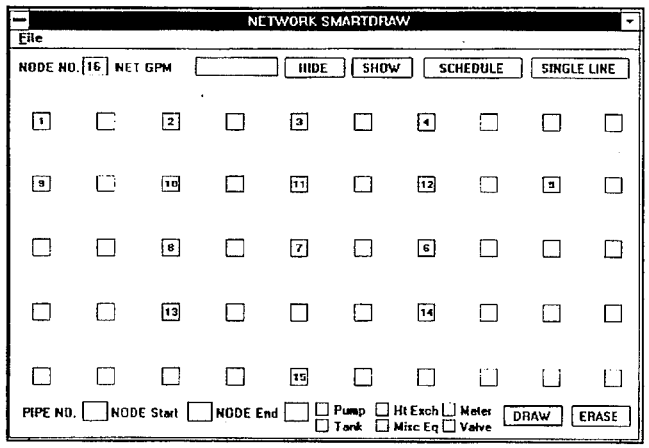

To identify the active node sites, enter the node number and then click on an active node button to label the button with the node number. The BREF( ) reference array is then updated to reflect the node label assigned to each button control number. For example, when clicking on node #4, then BREF(4) = 7. When clicking on node #7, then BREF(7) = 25. When clicking on node #15, then BREF(15) = 45. For each activated node #j, then BTNSWT(j) = 1 otherwise BTNSWT(j) = 0.

Figure 4B: Interface for a Coordinate Based Network Drawing System, Step 2

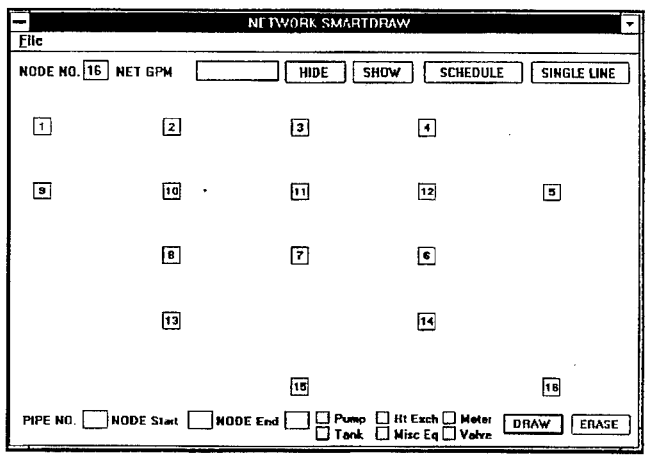

When the nodes have been identified, the unused nodes can be hidden by clicking on the Hide button. The BTNSWT( ) array is used to determine which nodes should be hidden. To add more nodes, click on the Show button to show all nodes. Node numbers can also be changed by entering a new number and clicking on the desired node. Other attributes can be added to nodes such as a net flowrate, load, etc and assigned as the node is labeled.

Figure 4C: Interface for a Coordinate Based Network Drawing System, Step 3

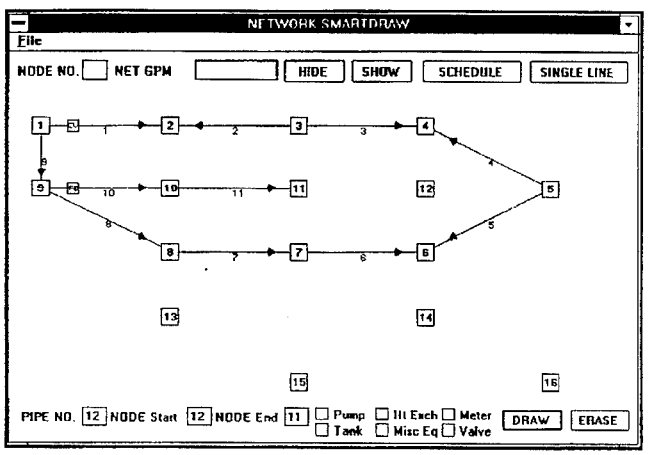

To identify the elements between nodes, enter the Node Start and Node End and click on the Draw button. In this example, the pipes are the elements. When the Draw button is selected, the pipe number is assigned to the pipe element drawn between the nodes and the NSTART( ) and NEND( ) arrays are updated. The NSTART( ) and NEND( ) arrays are used in the BREF( ) array to determine the coordinates of the start and end of the pipe element from the BXFAC( ) and BYFAC( ) arrays. Attributes such as process equipment can be selected and drawn, as well.

GRAPHIC INPUT AND DISPLAY OF NETWORK BASED COMPUTATIONS

BACKGROUND—FIELD OF INVENTION

The present invention relates to the automatic drawing of elements between nodes of a network system utilizing a coordinate based system and more specifically to the drawing of network systems commonly utilized in engineering computations.

BACKGROUND OF THE INVENTION—PRIOR ART

Presently, the development of network systems has been done manually or inefficiently with traditionaly drawing or CAD software. Network system analysis is used in structural engineering, hydraulic engineering, thermodynamic engineering, etc. to solve a wide variety of engineering problems. Complex networks need to be drawn to provide a clear presentation of the problem that is being solved. The network system drawing consists of nodes or junctions and elements or lines between the nodes. The nodes and elements are typcially numbered to provide reference to the engineering formula utilized to solve the network analysis. The primary concerns in drawing a network system are to properly identify all the nodes and elements and their connections.

The traditional drawing or CAD approach to drawing network systems requires that each node of the network be physically drawn and located. Since the nodes and elements of a network system drawing do not require any exact placement, there is no requirement for a precision drawing environment which is used by traditional CAD or drawing software. This type of approach has required the user to enter into a node entry mode and then place the nodes on the drawing. Then, additional effort is required to place the nodes so that they are aligned with each other. To connect the nodes with elements, the user then selects an element entry mode. The user must carefully click or select the start node and drag the element until the end node becomes highlighted to insure that the connection between nodes is accomplished. If the user clicks before selecting the node, the element will typically be shown but the connection with the desired node has failed.

The use of a coordinated based network drawing system as detailed below avoids the problem of insuring connection and alignment between nodes. This is accomplished by utilizing preset activated node sites that can be labeled as desired while unused nodes can be de-activated. The coordinates of each node are identified through a set of unique data arrays to allow specified elements to be directly connected between nodes. This coordinate based approach to network drawing is more direct and efficient while providing a clearer and more compact presentation of a network system.

SUMMARY OF THE INVENTION—OBJECTS AND ADVANTAGES

The Invention consists of a single common network drawing interface along with unique data arrays to allow for coordinate based drawing of network elements between specified node sites. This coordinate based network drawing system is processed through the random access memory area of a generic data processor. The general data processor is a personal computer system designed to operate under the MSDOS®, Windows®, Macintosh®, or similar operating systems. The processor would consist of a display monitor, keyboard, mouse pointing device, printer, and central processing unit with random access memory, floppy disk drive, and hard disk drive. The single common network drawing interface contains a set of available node sites or buttons that are assigned a specific node number as they are selected. Unused nodes can be removed using the Hide command button or shown again using the Show button. Elements between nodes are automatically drawn using the coordinate based network drawing system by specifying the element's node start and node end and selecting the Draw button. These elements can be removed by entering the same specifications and selecting the Erase button.

Unique data arrays are used to store coordinate and reference data for each node and element in the hard disk storage area of the general data processor. These arrays allow for automatic drawing of elements between nodes for any set of specified node sites. Additionally, these arrays provide data necessary for the engineering computations involved with a network system analysis.

A modern computer interface design including pull-down menus and command buttons is used in the single common network drawing interface. This allows the user to quickly become efficient in the operation of this process system. These designs are found in many other commercial software packages that are commonly used on current graphical-based operating systems such as Microsoft Windows ®. These interface designs have proven to provide increased use and proficiency over single step keyboard entry systems as is used in earlier MSDOS® systems.

The advantage of using a coordinate based network drawing system is that it can automatically draw network elements between nodes with the alignment and connection of each node and element guaranteed. The network drawings are more efficiently produced while providing a clean and compact presentation. Additionally, the values stored in the unique data arrays can be directly used in the engineering computations typically required for network analysis.

BRIEF DESCRIPTION OF THE DRAWINGS

Other advantages of the invention become apparent upon reading the following detailed description and upon referral to the drawings of which:

FIG. 1 describes the unique data arrays required for determining the coordinates of specified nodes for direct connection of elements between nodes.

FIG. 2 describes how the coordinates of specified nodes are determined using the unique data arrays.

FIG. 3 describes the detail program code required for the process of a coordinate based network drawing system.

FIG. 4 details the stepwise process and interface for a coordinate based network drawing system.

REFERENCE NUMERALS IN DRAWINGS

1 BXFAC() horizontal coordinate data array
2 BYFAC () vertical coordinate data array
3 BTNSWT() node/button switch data array
4 BREF() node/button reference data array
5 NSTART() node start data array
6 NEND() node end data array
7 NodeButton activated node sites
8 HideButton command button
9 ShowButton command button
10 DrawButton command button
11 EraseButton command button 12 Interface for Coordinate Based Network Drawing System While the invention is susceptible to various modifications and alternative forms, a specific embodiment of the invention is described in detail below. This description is not intended to limit the invention to the particular form disclosed, but the invention is to cover all modifications and alternatives falling within the scope of the invention as defined by the claims below. Such modifications could include the use of different data array structures to accomplish the same type of coordinate determination, the use of a different screen layout for the coordinate based network drawing system, etc.

DESCRIPTION OF PREFERRED EMBODIMENT

Several unique data arrays are utilized as shown in FIG. 1 for the process of a coordinate based network drawing system. The BXFAC() 1 data array is used to identify the horizontal coordinate of any activated and labeled node site. And, the BYFAC() 2 data array is used to identify the vertical coordinate of any activated and labeled node site. The BTNSWT() 3 data array is used to indicate if a node site is activated or de-activated. The BREF() 4 data array references the control number assigned to each activated and labeled node for use in determining the coordinates and activation state of each node site. The NSTART() 5 and NEND() 6 data arrays contain the starting and ending node number for each element.

Coordinates are determined for each node or button by evaluating the BXFAC() 1 and BYFAC () 2 data arrays for the start and end node of each element as shown in FIG. 2. The button control number used in these arrays is determined using the BREF() 4 button reference data array for the NSTART() 5 or NEND() 6 being specified. Once the coordinates are determined for the starting and ending nodes, the element can be directly drawn between these nodes with a guaranteed connection.

FIG. 3 provides details on the coding required for the process of a coordinate based network drawing system. When a NodeButton(index) 7 button is selected from the set of available activated node buttons, the NodeNo variable is retrieved from the Node Number text input box. This BTNSWT(NodeNo) 3 array value is then set from 0 to 1 to indicate the node is activated. The caption for the selected button is also changed to the entered node number, as well. The BREF(NodeNo) 4 array value is also assigned to the control number for the button (index+1). For the computer language shown, the index variable for buttons is one digit less than the variables used in the data arrays.

The HideButton 8 command button is used to hide any unused nodes while the ShowButton 9 command button will again show these unused nodes. The BTNSWT(NodeNo) 3 array value is used to determine if the node is activated for use in hiding or showing the node buttons.

The DrawButton 10 command button will draw an element between the specified node start and node end locations. When drawing an element, a wide variety of various attributes could be selected and associated with the element as it is drawn. For the pipeline example shown in FIG. 4, this would allow the inclusion of various types of process equipment in the pipeline as it is drawn. The X1, X2 coordinates are obtained from the BXFAC() 1 data array, and the Y1, Y2 coordinates are obtained from the BYFAC() 2 data array. The line can then be drawn between coordinates X1, Y1 and X2, Y2 with the element or pipeline number printed halfway between the nodes. Attributes for the line can be placed on either side of the element centerline such as equipment, directional arrows, load indicators, etc. For erasing an element, the EraseButton 11 command button will draw the same line and attributes using the same foreground color as the background color.

An interface for a coordinate based network drawing system 12 is shown in FIG. 4 along with a stepwise description of the process. The computer screen shows a set of available node sites represented by small command buttons. As the node number is entered and a NodeButton() is selected, the node label will appear on the node button and the BREF() 4 data array is updated. The BTNSWT() 3 data array is also updated to indicate the selected button is activated. When all the nodes have been specified, the HideButton 8 command button is selected to remove the unused nodes.

In FIG. 4, pipelines are used as the elements between nodes. These pipes are drawn by entering the pipe number, the node start, the node end, and selecting the DrawButton 10 command button. Any selected attributes for this pipe are automatically drawn, as well. In this example, the direction of flow through the pipelines is also shown. When the network has been fully specified, the appropriate engineering computations can be applied using the network specification identified in the unique data arrays of the coordinate based network drawing system.

In summary, this process for a coordinate based network drawing system utilizing unique data arrays allows for an efficient and compact network drawing with a minimal amount of effort. This process could also be utilized for any category of software programs that need to graphically represent a networking system.

What is claimed is:

1. A process for drawing a network system to perform analysis computations utilizing data arrays residing in a random access memory of a general data processor of known type for enabling said general data processor to retain coordinate and connection data of specified network elements between designated network nodes for use in displaying said network system on a connected display of said general data processor and performing said analysis computations for said network system, said process comprising the steps of:

a. displaying a set of available said network node sites at specific coordinate positions on said connected display screen of said general data processor that are stored in said random access memory of said general data processor;

b. designating said network nodes and storing in said random access memory of said general data processor the coordinate and reference data for each designated said network node for use in connecting said network elements between said network nodes;

c. displaying only designated said network nodes from the set of available said network nodes on said connected display screen of said general data processor when executing a command;

d. adding or deleting said network elements between said network nodes by specifying and storing in said data arrays the start and end designation of said network nodes for each said network element and executing a command.

e. graphically displaying said network elements between said network nodes on said connected display screen of said general data processor utilizing information stored in said data arrays without any further action required by a user; and f. upon further command performing said simulation computations using said connection data of said network system stored in said data arrays.

2. An apparatus for drawing a network system to perform analysis computations and including a general data processor of known type with a connected display and utilizing data arrays residing in a random access memory of said general data processor for enabling said general data processor to retain coordinate and connection data of specified network elements between designated network nodes for use to display said network system on said connected display of said general data processor and to perform said analysis computations for said network system, said apparatus comprising:

a. a set of available said network node sites at specific coordinate positions that are stored in said random access memory of said general data processor and displayed on said connected display of said general data processor;

b. means for designating said network nodes and storing in said random access memory of said general data processor the coordinate and reference data for each designated said network node for use in connecting said network elements between said network nodes;

c. Said general data processor programmed to display only designated of said network nodes from the set of available said network nodes on said connected display screen of said general data processor upon execution of a command;

d. means for adding or deleting said network elements between said network nodes by specifying and storing in said data arrays the start and end designation of said network nodes for each said network element upon execution of a command;

e. said general data processor programmed to graphically display said network elements between said network nodes utilizing information stored in said data arrays without any further action required by user; and f. said general data processor further programmed to perform said analysis computations using said connection data of said network system stored in said data arrays upon execution of a command.

* * * * *